(12) United States Patent
Lin (10) Patent No.: US 9,430,206 B2
(45) Date of Patent: Aug. 30, 2016

(54) SYSTEMS FOR DOWNLOADING LOCATION-BASED APPLICATION AND METHODS USING THE SAME

(71) Applicant: Hsiu-Ping Lin, Taipei (TW)

(72) Inventor: Hsiu-Ping Lin, Taipei (TW)

( * ) Notice: Subject to any disclaimer, the term of this patent is extended or adjusted under 35 U.S.C. 154(b) by 0 days.

(21) Appl. No.: 13/714,245

(22) Filed: Dec. 13, 2012

(65) Prior Publication Data

US 2013/0159996 A1    Jun. 20, 2013

(30) Foreign Application Priority Data

Dec. 16, 2011 (TW) .............................. 100146857 A
Jan. 20, 2012 (TW) .............................. 101102596 A
Apr. 2, 2012 (TW) .............................. 101111774 A
Jul. 13, 2012 (TW) .............................. 101125473 A (51) Int. Cl.
*G06F 9/44* (2006.01)
*G06F 9/445* (2006.01)

(52) U.S. Cl.
CPC ............... *G06F 8/60* (2013.01); *G06F 9/4443* (2013.01)

(58) Field of Classification Search
None
See application file for complete search history.

(56) References Cited

U.S. PATENT DOCUMENTS

| | | | | |
|---|---|---|---|---|
| 6,326,962 B1 * | 12/2001 | Szabo | ............................ | 715/762 |
| 7,139,551 B2 * | 11/2006 | Satish | ............... | H04M 1/72525 455/412.1 |
| 7,978,207 B1 | 7/2011 | Herf et al. | | |
| 8,014,943 B2 | 9/2011 | Jakobson | | |
| 8,291,408 B1 * | 10/2012 | Czymontek | ................... | 717/178 |
| 8,365,164 B1 * | 1/2013 | Morgenstern | ................. | 717/175 |
| 2003/0050932 A1 * | 3/2003 | Pace et al. | ..................... | 707/100 |
| 2004/0030493 A1 * | 2/2004 | Pechatnikov | .......... | G01C 21/26 701/411 |
| 2004/0268106 A1 * | 12/2004 | Holmberg et al. | ............... | 713/1 |
| 2005/0050538 A1 * | 3/2005 | Kawamata | ............... | G06F 8/61 717/168 |
| 2005/0102584 A1 * | 5/2005 | Paturi et al. | .................... | 714/47 |
| 2006/0101449 A1 * | 5/2006 | Gatz | ........................ | G06F 8/61 717/168 |
| 2006/0106806 A1 * | 5/2006 | Sperling et al. | ................ | 707/10 |
| 2006/0174242 A1 * | 8/2006 | Zhu et al. | ..................... | 717/172 |
| 2008/0040495 A1 * | 2/2008 | Adams et al. | ................ | 709/230 |
| 2008/0140278 A1 * | 6/2008 | Breed | ............................ | 701/29 |
| 2008/0208699 A1 * | 8/2008 | Tsunasawa | ............. | G07F 9/026 705/21 |
| 2008/0244059 A1 * | 10/2008 | Bou-Ghannam | ....... | G06F 3/038 709/223 |
| 2009/0005981 A1 | 1/2009 | Forstall et al. | | |
| 2009/0037835 A1 * | 2/2009 | Goldman | ..................... | 715/771 |
| 2009/0094602 A1 * | 4/2009 | Ziskind et al. | ............... | 717/178 |

(Continued)

*Primary Examiner* — Isaac T. Tecklu
*Assistant Examiner* — Daxin Wu
(74) *Attorney, Agent, or Firm* — Opes IP Consulting Co.; Laurence Kao (57) ABSTRACT

Systems for downloading location-based applications and associated methods are disclosed. The system can include a memory storing computer-executable instructions and a processor for executing the instructions. The instructions include communicating with a storage device storing a plurality of application packages having associated locations, and receiving a search criterion from a user via a user interface. The instructions further include selecting the application packages based on the search criterion, and displaying at least one selected application package on a map through the user interface. The selected application package can be positioned on the map based on the corresponding associated locations. The instructions further include allowing the user to download the selected application package through the user interface.

32 Claims, 7 Drawing Sheets

(56) References Cited

U.S. PATENT DOCUMENTS

| | | | | |
|---|---|---|---|---|
| 2009/0216633 A1* | 8/2009 | Whitsett | G06Q 30/02 705/14.36 | |
| 2009/0249290 A1* | 10/2009 | Jenkins | G06F 9/4443 717/109 | |
| 2009/0260004 A1* | 10/2009 | Datta et al. | 717/175 | |
| 2010/0131366 A1 | 5/2010 | Gibson et al. | | |
| 2010/0204914 A1 | 8/2010 | Gad et al. | | |
| 2010/0241944 A1 | 9/2010 | Athsani et al. | | |
| 2010/0306759 A1* | 12/2010 | Kohler et al. | 717/174 | |
| 2011/0035742 A1* | 2/2011 | Shenfield | G06F 9/44521 717/171 | |
| 2011/0071915 A1 | 3/2011 | Lee et al. | | |
| 2011/0252381 A1* | 10/2011 | Chaudhri | G06F 3/04883 715/838 | |
| 2011/0307354 A1* | 12/2011 | Erman et al. | 705/27.1 | |
| 2012/0011446 A1 | 1/2012 | Harvin et al. | | |
| 2012/0102165 A1* | 4/2012 | Gruen | G06F 8/60 709/222 | |
| 2012/0159357 A1 | 6/2012 | Lim et al. | | |
| 2012/0214451 A1* | 8/2012 | Richardson et al. | 455/414.1 | |
| 2013/0159993 A1* | 6/2013 | Misovski et al. | 717/177 | |
| 2014/0089913 A1* | 3/2014 | Aaronson et al. | 717/174 | |
| 2014/0173580 A1* | 6/2014 | McDonald et al. | 717/170 | |

* cited by examiner

SYSTEMS FOR DOWNLOADING LOCATION-BASED APPLICATION AND METHODS USING THE SAME

CROSS-REFERENCE TO RELATED APPLICATION(S)

The present application claims priority to Taiwan Patent Application No. 100146857, filed Dec. 16, 2011; Taiwan Patent Application No. 101102596, filed Jan. 20, 2012; Taiwan Patent Application No. 101111774, filed Apr. 2, 2012; and Taiwan Patent Application No. 101125473, filed Jul. 13, 2012. These four Taiwanese patent applications are incorporated herein by reference in their entirety.

TECHNICAL FIELD

The present technology relates generally to systems for downloading location-based applications and associated apparatus and methods. In particular, several embodiments are directed to systems for downloading location-based application packages, systems for providing a location-based application service, apparatus for implementing a location-based service, or associated methods.

BACKGROUND

In recent years, demands for mobile device (e.g., a smartphone) applications (referred to as "APPs") significantly increase when mobile devices become more and more popular. Traditionally, in order to have a customized APP, one needs to either create the APP by himself, or hire a professional programmer to do so. The former requires specific programming expertise, and the latter incurs expenses. Therefore, it is advantageous to have a convenient way to generate customized APPs with certain functions. Location-based services include, for example, providing users certain maps with some useful information, such as points of interest (POI), gas stations, or restaurants. It would be also advantageous to have a system that allows users to download the generated location-based APPs.

BRIEF DESCRIPTION OF THE DRAWINGS

Many aspects of the present technology can be better understood with reference to the following drawings. The components in the drawings are not necessarily to scale. Instead, emphasis is placed on illustrating clearly the principles of the present technology.

DETAILED DESCRIPTION

Various aspects and embodiments of the present technology will be described below. The following description provides specific details for a thorough understanding and enabling description of these embodiments. One skilled in the art will understand, however, that the present technology may be practiced without many of these details. The terminology used in the description presented below is intended to be interpreted in its broadest reasonable manner, even though it is being used in conjunction with a detailed description of certain specific embodiments of the present technology. Any terminology intended to be interpreted in any restricted manner will be overtly and specifically defined as such in this Detailed Description section.

Several embodiments of the present technology are described below with reference to systems for downloading location-based APPs, systems for providing a location-based APP service, apparatus for implementing a location-based APP service, and associated methods. The systems in accordance with the present technology allow users to download location-based APPs with customized functions through a user interface. Specific details are identified in the following description with reference to FIGS. 1-7 to provide a thorough understanding of various embodiments of the present technology. Other details describing well-known structures or processes often associated with computing systems, however, are not described below to avoid unnecessarily obscuring the description of the various embodiments of the present technology. Moreover, although the following technology sets forth several embodiments of different aspects of the technology, other embodiments can have different configurations and/or different components than those described in this section. In addition, further embodiments of the present technology may be practiced without several of the details described below, while still other embodiments of the present technology may be practiced with additional details and/or features.

Systems for Downloading Location-Based APPs

Figure 1:
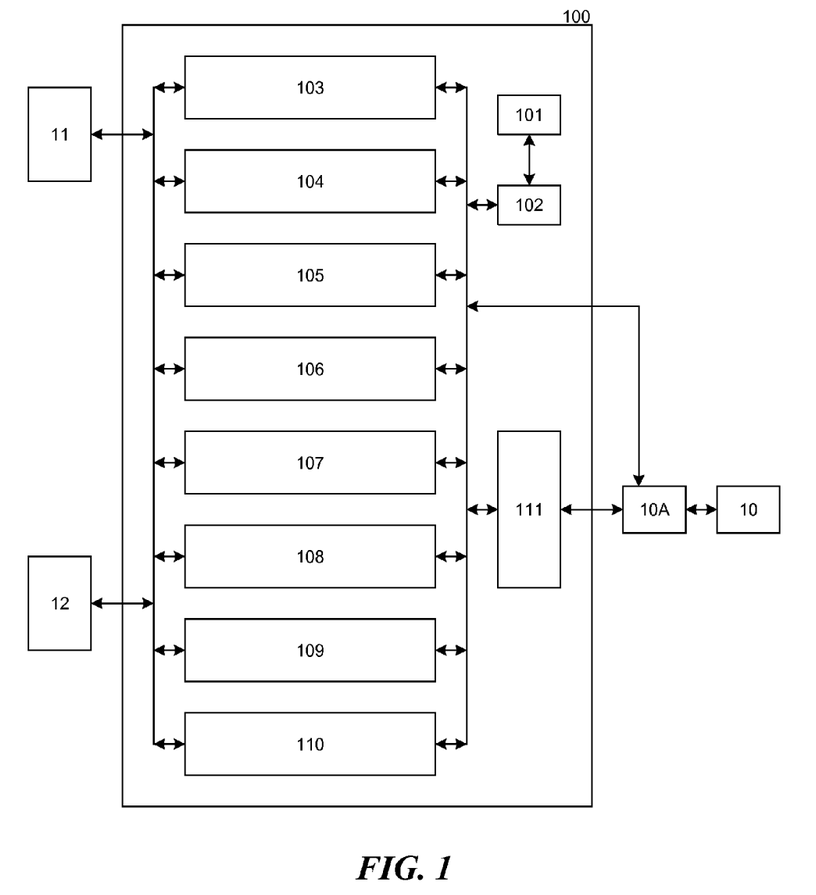
FIG. 1 is a schematic diagram illustrating a system for downloading location-based APPs in accordance with embodiments of the present technology.

Several embodiments of the present technology are directed to systems for downloading location-based APPs. FIG. 1 is a schematic diagram illustrating a system 100 for downloading location-based APPs in accordance with embodiments of the present technology. As shown in FIG. 1, the system 100 can include a processor 101, a memory 102, a generation module 103, a ranking module 104, a download module 105, a record module 106, a calculation module 107, a search module 108, a location module 109, a map module 110, and a display module 111. The processor 101 can be configured to execute the instructions stored in the memory 102 (e.g., instructions related to the modules 103-111 within the system 100). The system 100 can communicate with a user 10 via a user interface 10A. As shown in FIG. 1, the system 100 can also communicate with a storage device 11 and a map database 12.

The storage device 11 can store a plurality of customized application packages. The application packages can be associated with corresponding APPs. Further, the application packages can include information regarding how to install or use the corresponding APPs. In some embodiments, the application package can be an APK format file (for Android operating system), or an IPA format file (for iOS operating system). In other embodiments, the application packages can be in any file formats suitable for users to download and install. In some embodiments, the application packages stored in the storage device 11 can be generated by the generation module 103 of the system 100 upon requests. For example, a physical store owner may want to create a customized APP that allows store customers to interact with the store directly (e.g., making online purchases, checking-in, or providing feedback through the customized APP). The physical store owner can include a title (e.g., the store's name), an associated location (e.g., by providing a set of coordinates), images (e.g., pictures of the store, logos, or icons), or other information in the customized APP by providing the related information to the generation module 103 (e.g., via the user interface 10A). In some embodiments, the associated location can be the store's physical location. In other embodiments, the associated location can be any location chosen by the store owner (e.g., the store owner may want to associate the customized APP with a certain location where the customers visit frequently, such as a famous POI). After receiving a request for generating a customized APP, the generation module 103 can generate (e.g., compile) and include related information in an application package, and then the generated application package can be stored in the storage device 11, such that the user 10 (e.g., a potential customer for the physical store) can download this generated application package through the system 100. In other embodiments, the application packages stored in the storage device 11 can be generated by other independent sources (e.g., directly uploaded by a store owner).

In some embodiments, the application packages can include an instant messaging (IM) function. For example, User A and User B can both download the application package AA with an IM function (e.g., allowing users to send and receive instant messages through IM servers). User A and User B can execute (e.g., install) the downloaded application package AA and then have the associated APPs ready to use. When User A and User B are both using their APPs associated with the downloaded application packages AA (either after installation or not), User A and User B can communicate with each other by their APPs' IM function (e.g., through an IM server, such as the system 100 or the storage device 11). In other embodiments, User A can download a customized application package BB while User B can download another customized application package CC. Both customized application package BB and customized application package CC can have the IM function. When User A and User B are using their APPs associated with the application packages BB and CC (either after installation or not), User A and User B can still communicate with each other by the IM function.

As shown in FIG. 1, the system 100 can include the ranking module 104. The ranking module 104 can be configured to assign a ranking number to each application package stored in the storage device 11, The ranking number can be determined based on a specific factor. In some embodiments, the special factor can be a distance (e.g., 100 meters) between a user location (e.g., the current location of the user 10, or a location input by the user 10) and the associated location of the application package. In other embodiments, the specific factor can be: (1) the time that the application package is generated (e.g., by the generation module 103); (2) the time that the application package is stored (e.g., in the storage device 11); (3) the number that the application package has been downloaded (e.g., this number can be recorded by the record module 106 as discussed below); (4) the number that a hyperlink associated with the application package has been accessed (e.g., the QR™ code or other hyperlinks); (5) a to associated with the application package (e.g., a service charge for generating the application package, or an advertisement fee related to the application package); and/or (6) points associated with the application package (e.g., credit points to the store owner who requests to generate an application package, or reward points for users who download the application package).

In some embodiments, the ranking number can be determined by a combination of different specific factors discussed above (e.g., with different weightings). The ranking number created by the ranking module 104 allows the system 100 to display the application packages in a specific order. For example, when the system 100 plans to display three application packages whose associated locations are in the same location (or within a close proximity, such as 10 meters), these three application packages can be displayed following an order based on their ranking numbers (e.g., APP1-APP3 shown in FIG. 4).

The ranking module 104 can also be configured to assign a special ranking number to at least one of the application package. The special ranking number represents higher priority over a regular ranking number (e.g., in FIG. 4, APP4 has priority over APP 5). For example, a store owner may want to pay an additional advertisement fee to let his application package (associated with his physical store) have a better accessibility or exposure (e.g., being displayed in front of others) than other application packages in the same location (or within a close proximity). In some embodiments, the ranking module 104 can further store the assigned ranking numbers and special ranking numbers in the storage device 11. In other embodiments, the ranking numbers can be stored in any other suitable storage devices (e.g., outside or inside the system 100).

As shown in FIG. 1, the system 100 can include the download module 105. The download module 105 can be configured to allow the user 10 to download application packages via the system 100. The download module 105 can provide the user 10 a link connected to a specific application package stored in the storage device 11. The link can be a Hypertext Transfer Protocol (HTTP) link, a Extensible Markup Language (XML) link, a JavaScript Object Notation (JSON) link, or any other suitable links. In some embodiments, the download module 105 can provide a link displayed (e.g., by the display module 111 discussed below) at the user interface 10A, such that the user 10 can directly download the specific application package (e.g., through the download link 404 in FIG. 4, or the download links 503, 505 in FIG. 5). In some embodiments, the download module 105 can include a Hypertext Preprocessor (PHP) file, an Active Server Pages (ASP) file, a JavaServer Pages (JSP) file, a Java Runtime Environment (JRE) file, an ActiveX file, a JavaScript, or other suitable files for facilitating the download tasks. In some embodiments, after downloading, the user 10 can install the downloaded specific application package. In other embodiments, the downloaded specific application package can be executed without further installation.

As shown in FIG. 1, the system 100 can include the record module 106. The record module 106 can be configured to count and/or record a download number indicating the number of downloads made of each application package. In some embodiments, the download numbers of the application packages can be stored in the storage device 11. In other embodiments, the download number can be stored in any other suitable storage devices.

In some embodiments, the record module 106 can maintain an attribute database or a datasheet for recording information, properties, attributes, or statuses associated with each application package. For example, the attribute database can include: (1) names or titles of the application packages; (2) sets of coordinates (e.g., latitude and longitude) associated with the application packages; (3) serial identification numbers (e.g., assigned by the system 100) of the application packages; (4) links to associated images (e.g., indicating where the associated files are stored); (5) links for downloading the application packages (e.g., indicating where the application packages are stored); (6) the download numbers; (7) the ranking numbers assigned by the ranking module 104; and/or (8) fees or credits associated with the application packages (e.g., created by the calculation module 107 discussed below). In some embodiments, the attribute database or the datasheet can be stored in the storage device 11. In other embodiments, the attribute database or the datasheet can be stored in any other suitable storage devices.

As shown in FIG. 1, the system 100 can include the calculation module 107. The calculation module 107 can be configured to calculate fees to be charged or points to be allocated. In some embodiments, the calculation can be made based on the download numbers of the application packages. For example, the calculation module 107 can calculate service fees (e.g., a flat fee arrangement for unlimited downloads, or different rates for different numbers of downloads) for a store owner who have requested to generate a customized application package for his store. In another example, the calculation module 107 can calculate credit points for users who download a specific application package. In other embodiments, the calculation module 107 can calculate fees or credit points for application package requesters (e.g., a store owner) in accordance with an advertisement-profit-sharing arrangement (e.g., not directly related to the download numbers).

As shown in FIG. 1, the system 100 can include the search module 108. The search module 108 can be configured to select application packages stored in the storage device 11 based on a search criterion provided by the user 10. In some embodiments, for example, the user 10 can input the search criterion through the user interface 10A, and the search criterion can then be transmitted to the search module 108. The search criterion can include: (1) a distance (e.g., a distance between the current location of the user 10 and the associated location of the application package); (2) a name or a title of the application package; (3) a type of the application package (e.g., application packages associated with restaurants or supermarket); (4) ranking numbers assigned by the ranking module 104; (5) fees or points related to downloading the application package; and/or (6) popularity of the application package (e.g., numbers of prior downloads). In some embodiments, the search module 108 can also conduct a keyword search for application packages. For example, the keyword search can be conducted in the attribute database maintained by the record module 106, as discussed above. In other embodiments, the search module 108 can allow the user 10 to choose the search criterion from a predetermined list (e.g., by a check box or a drop-down list) at the user interface 10A.

As shown in FIG. 1, the system 100 can include the location module 109. The location module 109 can be configured to receive or retrieve a current user location of the user 10. In some embodiment, the current user location can be received from a user input (e.g., through the user interface 10A). In other embodiments, the current user location can be retrieved from a global positioning system (GPS) device (not shown) used by the user 10. The location module 109 can transmit the current user location to the search module 108 for further process (e.g., to calculate the distances between the current user location and the associated location of each application package). The location module 109 can also transmit the current location to the display module 111 (discussed below), such that the current user location (e.g., Location A in FIG. 4) can be displayed on a map (e.g., received from the map database 12, as discussed below). In other embodiments, the location module 109 can also be configured to receive images, titles, records, or statuses associated with the application package, and then transmit the same to the display module 111 (discussed below) or storage devices (not shown).

As shown in FIG. 1, the system 100 can include the map module 110 to communicate with the map database 12. The map module 110 can be configured to receive map-related information from the map database 12 and provide the same (e.g., with certain edits, if appropriate) to the display module 111 (discussed below). The map database 12 can store geographic or map data related to the associated locations of the application packages. In some embodiments, the map database 12 can be a database dedicated to store geographic or map-related data. In other embodiments, the map database 12 can be a database or a storage device with multiple purposes.

As shown in FIG. 1, the system 100 can include the display module 1. The display module 111 can be configured to provide information-to-be-displayed to the user 10. More specifically, for example, the information-to-be-displayed can be graphically displayed at the user interface 10A. For example, the display module 111 can provide a download link (e.g., from the download module 107 discussed above) at the user interface 10A for the user 10 to download a selected application package (e.g., the user 10 can select an application package after conducting a search based on the search criterion as discussed above). In some embodiments, the download ink can be a hyperlink or a Quick Response code (QR™ code) associated with a corresponding application package. The display module 111 plays an important role to interact with other modules (e.g., modules 103-110) within the system 100. For example, the display module 111 can receive the information-to-be-displayed associated with the application package from the modules 103-110 of the system 100.

Systems for Providing a Location-Based APP Service (APP Marketplace)

Figure 2:
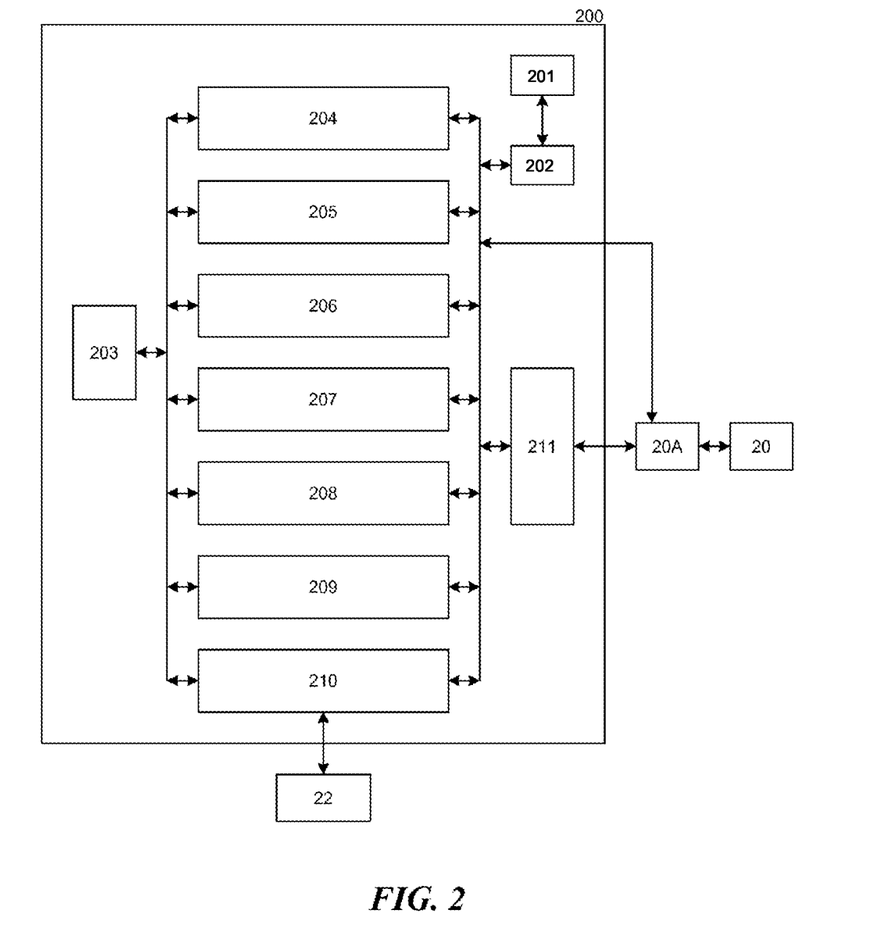
FIG. 2 is a schematic diagram illustrating a system for providing a location-based APP service in accordance with embodiments of the present technology.

Several embodiments of the present technology are directed to systems for providing location-based application service. FIG. 2 is a schematic diagram illustrating a system 200 for providing a location-based APP service in accordance with embodiments of the present technology. As shown in FIG. 2, the system 200 can include a processor 201, a memory 202, a storage device 203, a ranking module 204, a download module 205, a record module 206, a calculation module 207, a search module 208, a location module 209, a map module 210, and a display module 211. The processor 201 can be configured to execute the instructions stored in the memory 202 (e.g., instructions related to the modules 204-111 in the system 200). The system 200 can communicate with a map database 22 and a user 20 via a user interface 20A.

As shown in FIG. 2, the system 200 can include the storage device 203 to store a plurality of customized location-based APPs or application packages. Similar to the embodiments discussed in FIG. 1, the application packages stored in the storage device 203 can be generated (e.g., by the generation module 103) upon requests or from other sources. As shown in FIG. 2, the system 200 can include the ranking module 204. The ranking module 204 can be configured to assign a ranking number to each application package stored in the storage device 203. Similar to the embodiments shown in FIG. 1, the ranking number can also be determined based on the specific factor (see details above). The ranking number created by the ranking module 204 allows the system 200 to display the application packages in a specific order. In some embodiments, the ranking module 204 can also be configured to assign a special ranking number to at least one of the application package. The special ranking number represents higher priority over regular ranking numbers. In some embodiments, the ranking module 204 can further store the assigned ranking numbers and special ranking numbers in the storage device 203. In other embodiments, the assigned ranking numbers and special ranking numbers can be stored outside the system 200.

As shown in FIG. 2, the system 200 can include the download module 205. The download module 205 can be configured to allow the user 20 to download application packages. The download module 205 can provide the user 20 a link connected to a specific application package stored in the storage device 203. The link can be an HTTP link, an XML link, a JSON link, or other suitable links. In some embodiments, the download module 205 can provide a link displayed (e.g., by the display module 211 discussed below) at the user interface 20A, such that the user 20 can directly download the specific application package. In some embodiments, the download module 205 can include a PHP file, an ASP file, a JSP file, a JRE file, an ActiveX file, a JavaScript, or other suitable files to facilitate the download tasks. In some embodiments, after downloading, the user 20 can install the downloaded specific application package. In other embodiments, the downloaded specific application package can be executed without further installation.

As shown in FIG. 2, the system 200 can include the record module 206. The record module 206 can be configured to count and/or record a download number indicating the number of downloads made for each application package. In some embodiments, the download numbers of the application packages can be stored in the storage device 203. In other embodiments, the download number can be stored in any suitable devices outside the system 200. In some embodiments, the record module 206 can also maintain the attribute database or the datasheet, as discussed above, for recording information or properties associated with each application package. The attribute database or the datasheet can be stored in the storage device 203. In other embodiments, the attribute database or the datasheet can be stored in any other suitable storage devices outside the system 200.

As shown in FIG. 2, the system 200 can include the calculation module 207. The calculation module 207 can be configured to calculate fees to be charged or points to be allocated. In some embodiments, the calculation can be made based on the download numbers of the application packages. In other embodiments, the calculation module 207 can calculate fees or credit points for application package requesters (e.g., a store owner) in accordance with an advertisement-profit-sharing arrangement.

As shown in FIG. 2, the system 200 can include the search module 208. The search module 208 can be configured to select application packages stored in the storage device 203 based on a search criterion provided by the user 20. In some embodiments, for example, the user 10 can input the search criterion through the user interface 20A, and the search criterion can then be transmitted to the search module 208. In other embodiments, the search module 208 can also conduct a keyword search for the application packages. In some embodiments, the search module 208 can allow the user 20 to choose the search criterion from a predetermined list (e.g., by a check box or a drop-down list) at the user interface 20A.

As shown in FIG. 2, the system 200 can include the location module 209. The location module 209 can be configured to receive or retrieve a current user location of the user 20. The location module 209 can further transmit the current user location to the search module 208 for further process. The location module 209 can also transmit the current location to the display module 211 (discussed below), such that the current user location (e.g., Location A in FIG. 4) can be displayed on a map (e.g., received from the map database 22, as discussed below). In other embodiments, the location module 209 can be configured to receive images, titles, records, or statuses associated with the application package, and then transmit the same to the display module 211 (discussed below) or the storage device 203.

As shown in FIG. 2, the system 200 can include the map module 210 to communicate with the map database 22. The map module 210 can be configured to receive map-related information from the map database 22 and provide the same (e.g., with certain edits, if appropriate) to the display module 211 (discussed below). The map database 22 can store geographic or map data related to the associated locations of the application packages. In some embodiments, the map database 22 can be a database dedicated to store geographic or map-related data. In other embodiments, the map database 22 can be a database or a storage unit with multiple purposes.

As shown in FIG. 2, the system 200 can include the display module 211. The display module 211 can be configured to provide information-to-be-displayed to the user 20. For example, the information-to-be-displayed can be graphically displayed at the user interface 20A. In some embodiments, the download link can be a hyperlink or a QR™ code associated with a corresponding application package. The display module 211 also plays an important role to interact with other modules (e.g., the modules 204-210) within the system 200. For example, the display module 211 can receive the information-to-be-displayed associated with the application package from the modules 204-210 of the system 200.

Apparatus for Implementing a Location-Based APP Service (Mobile Devices)

Figure 3:
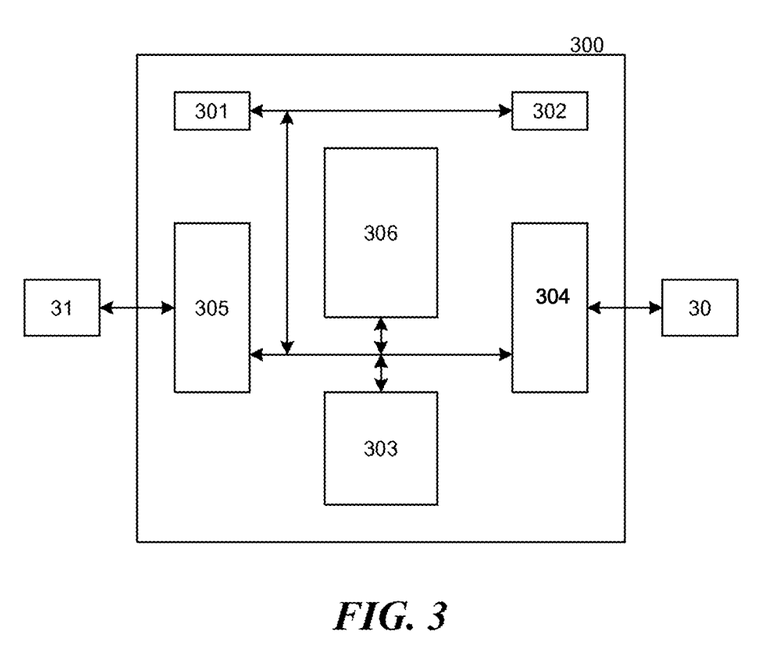
FIG. 3 is a schematic diagram illustrating an apparatus for implementing a location-based APP service in accordance with embodiments of the present technology.

Several embodiments of the present technology are directed to apparatus for implementing a location-based application service. FIG. 3 is a schematic diagram illustrating an apparatus 300 for implementing a location-based APP service in accordance with embodiments of the present technology. In some embodiments, the apparatus 300 can be a smartphone, a portable device, a notebook, a personal computer, or a user end terminal. As shown in FIG. 3, the apparatus 300 can include a processor 301, a memory 302, a storage device 303, an input device 304, a communication device 305, and a user interface 306. The processor 301 can be configured to execute the instructions stored in the memory 302 (e.g., instructions related to the devices 303-306 in the apparatus 300). The apparatus 300 can communicate with a server 31 and a user 30.

As shown in FIG. 3, the apparatus 300 can include the storage device 303 to store downloaded customized location-based APPs or application packages (e.g., downloaded from the server 31 via the communication device 305, as discussed below). In some embodiments, the storage device 303 can also be used to store installed application packages (e.g., some application packages need to be installed to be executable). As shown in FIG. 3, the apparatus 300 can also include the input device 304 and the communication device 305. In some embodiments, the input device 304 can be a keyboard, a mouse, or a writing pad. In other embodiments, the input module 304 can be a touch-screen device (e.g., a touch-screen monitor). The input device 304 can be configured to communicate with the user 30. For example, the input device 304 can receive a user current location or a search criterion from the user 30. The input device 304 can further transmit the received information to other devices within the apparatus 300 (e.g., to the user interface 306 for displaying), or to the server 31 through the communication device 305 (e.g. to search the application packages stored in the server 31). As shown in FIG. 3, the apparatus 300 can communicate with the server 31 through the communication device 305. In some embodiments, the communication device 305 can communicate with the server 31 via a wireless network. The communication device 305 can also transfer the downloaded application packages to the storage device 303 via the wireless network. In some embodiments, the server 31 can store a plurality of customized location-based APPs or application packages. In other embodiments, the server 31 can have functions similar to the systems 100 or 200, as discussed above.

As shown in FIG. 3, the apparatus 300 can include the user interface 306. The user interface 306 can be a graphical user interface for the user 30. In some embodiments, the user interface 306 can include a map (e.g., received from the server 31) with selected location-based application packages (e.g., as APP1-6 shown in FIG. 4). The displayed application packages can be selected from the server 31 based on the search criterion from the user 30. Further, the user interface 306 can also provide a download link for the user 30 to download a selected application package from the server 31. In some embodiments, the download link can be a hyperlink or a QR™ code associated with a corresponding application package.

User Interfaces

Figure 4:
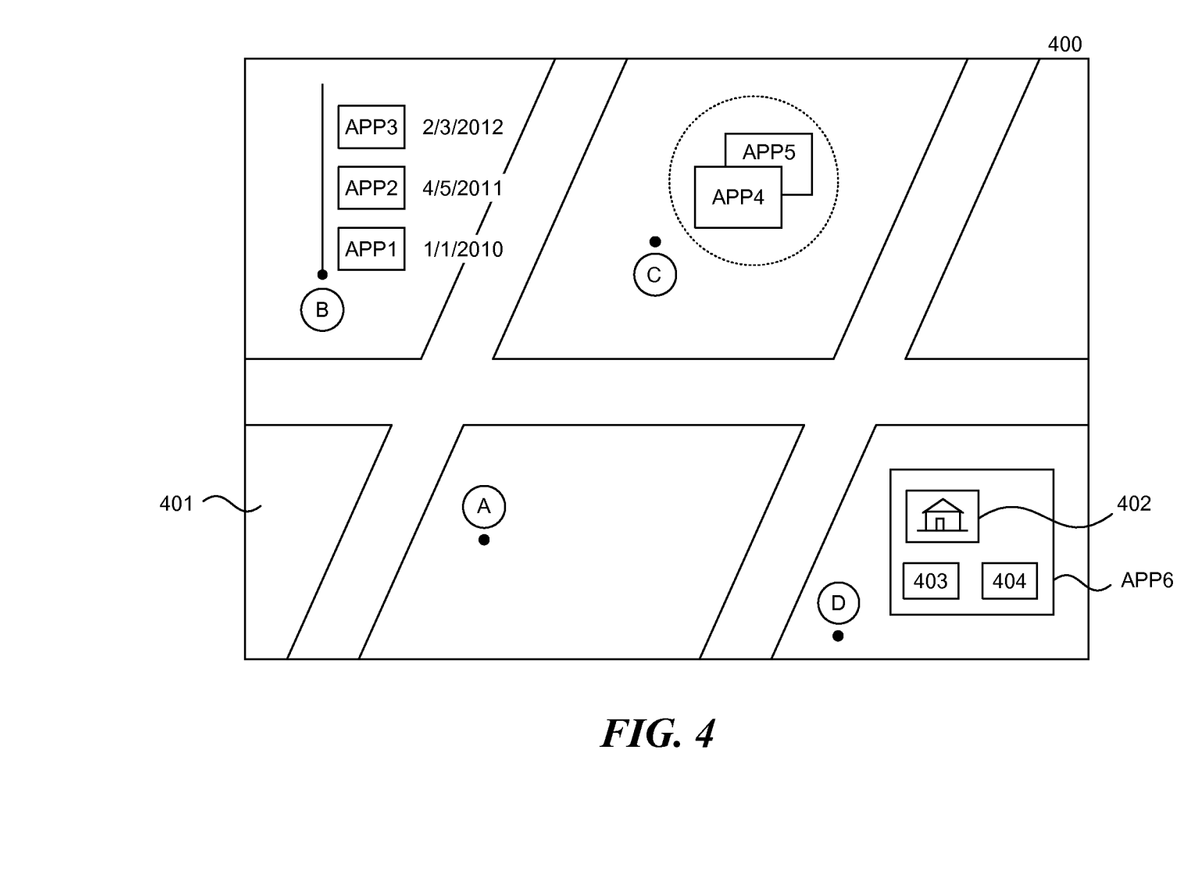
FIG. 4 illustrates a user interface in accordance with embodiments of the present technology.

FIG. 4 illustrates a user interface 400 in accordance with embodiments of the present technology. As shown in FIG. 4, the user interface 400 can include a map 401 as the background. In this embodiment, Location A shown on the map 401 represents a user current location, which can be input by a user or retrieved from a GPS device or other positioning systems. Locations B, C, and D shown on the map 401 respectively represent different associated locations of the selected (e.g., based on search criteria provided by the user) application packages (e.g., APP1-APP6 shown in FIG. 4). Specifically, the application packages APP1, APP2, and APP3 are located at (or within a close proximity of) Location B; the application packages APP 4 and APP 5 are located at (or within a close proximity of) Location C; and the application package APP6 is located at (or within a close proximity of) Location D. The user interface 400 allows the user to easily understand the relative locations between the user current location and the associated locations of the selected application packages.

As shown in FIG. 4, the application packages APP1, APP2, and APP3 located at Location B can be displayed by an order in accordance with the corresponding ranking numbers. The ranking numbers can be determined by the specific factor, as discussed above. In this embodiment, for example, the application package APP1 is displayed prior than the application packages APP2 and APP3 because the application package APP1 has an earlier generation date. The specific factor that actually decides the displaying order can also be shown next to the application packages (not shown in FIG. 4). In other embodiments, the application packages APP1, APP2, and APP3 can be displayed based on different ranking numbers determined by other specific factors.

As shown in FIG. 4, the application packages APP4 and APP5 located at Location C can be displayed by an order in accordance with the corresponding special ranking number. In this embodiment, the application package APP4 has been assigned a special ranking number that represents higher priority over a regular ranking number of the application package APP5. Thus, the application package APP4 can be displayed first (e.g., in front of the application package APP5). In other embodiments, the special ranking number can have different levels, such as a tier-1 special ranking number and a tier-2 special ranking number. In order to receive a special ranking number, those who request to generate the application packages (e.g., the store owner discussed above) can pay additional fee to purchase this special status. This special ranking status can be displayed next to the application package with the special ranking number (not shown in FIG. 5). For example, a special ranking description (such as, "Server Recommended") can be displayed next to the application package. The special ranking description can include any suitable languages that can be used to indicate the special ranking status.

As shown in FIG. 4, the application package APP6 located at Location D can be displayed with an icon 402, an APP description 403 and a download link 404. The icon 402 can include any suitable images, pictures, or symbols (e.g., trademarks) associated with the application package (e.g., provided by the application package requester as discussed above). In this embodiment, for example, the icon 402 can include a picture of the physical store associated with the application package APP6. In some embodiments, the size of the icon 402 can vary depending on certain popularity factors, such as download numbers or check-in numbers (e.g., some of the APP6 users may check-in at Location D before). In other embodiments, the size of the APP description 403 and the download link 404 can also vary depending similar factors.

As shown in FIG. 4, the APP description 403 can include a description or information related to the application package APP6. In this embodiment, for example, the APP description 403 can include the number of previous downloads of the application package APP6. In other embodiments, the APP description 403 can include information related to the application package APP6, such as a store name, a store address, store hours, the APP status (e.g., another user is downing the application package APP6; or another user is opening, activating, installing, or using the APP associated with the application package APP6), check-in numbers, or any other information that can be stored in the attribute database discussed above. As shown in FIG. 4, the download link 404 allows the user to download the application package APP6 directly.

Figure 5:
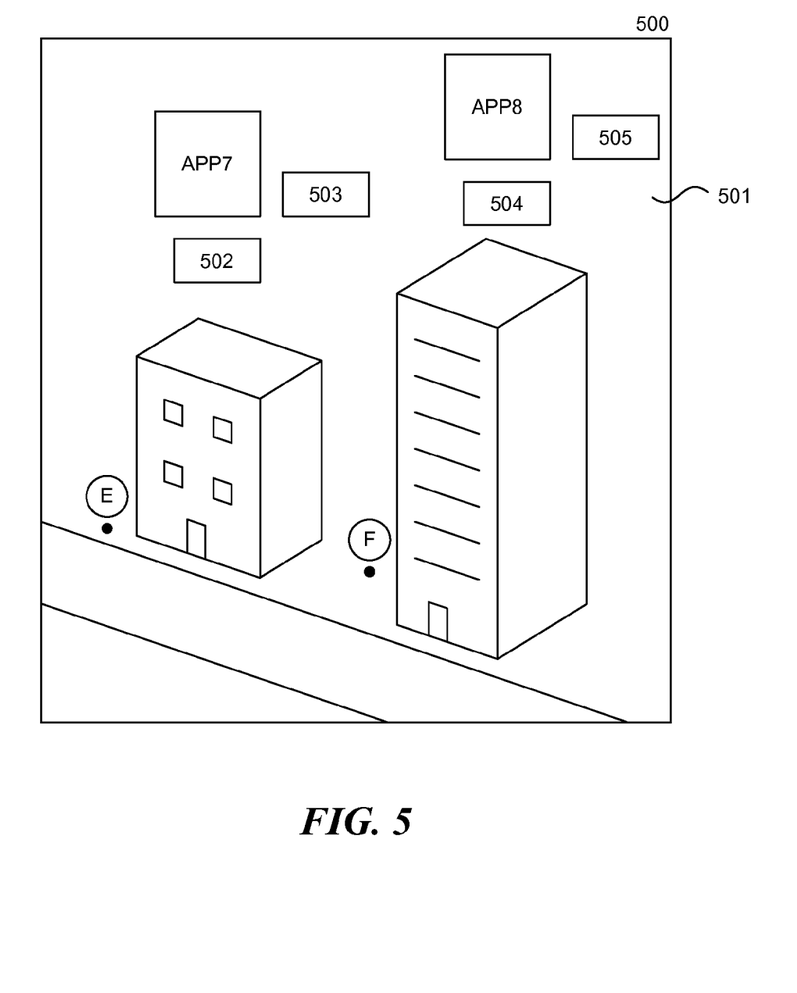
FIG. 5 illustrates another user interface in accordance with embodiments of the present technology.

FIG. 5 illustrates another user interface 500 in accordance with embodiments of the present technology. As shown in FIG. 5, the user interface 500 can include a three-dimensional map 501 as the background. The application packages APP7 and APP8 are associated with Location E and Location F respectively. The application packages APP7 and APP8 can be displayed respectively at Location E and Location F on the three-dimensional map 501. The application package APP7 can include an APP descriptions 502 and a download link 503, while the application package APP8 can include an APP descriptions 504 and a download link

505. The APP descriptions 502, 504 can have similar arrangement as the APP description 403 as discussed above, while the download links 503, 505 can have functions similar to the download link 404 as discussed above.

Associated Methods

Figure 6:
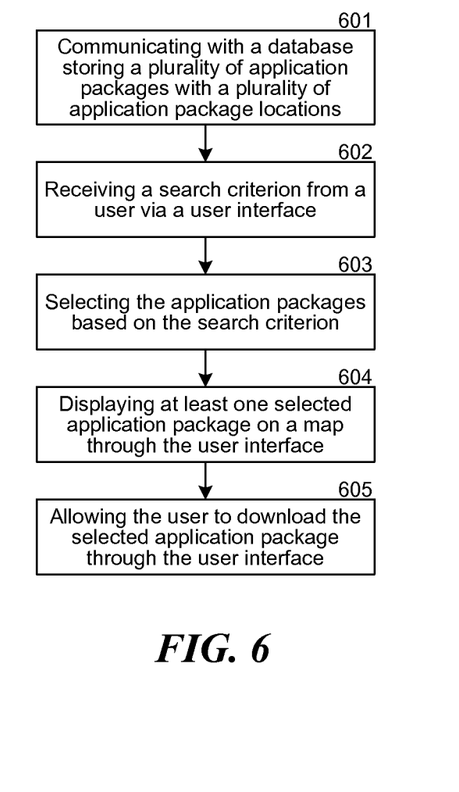
FIG. 6 is a flowchart illustrating a method for downloading location-based APPs in accordance with embodiments of the present technology.

FIG. 6 is a flowchart illustrating a method 600 for downloading location-based APP in accordance with embodiments of the present technology. As shown in FIG. 6, the method 600 can start at block 601 by communicating with a database (e.g., the storage device 11 in FIG. 1) storing a plurality of application packages (e.g., APP1-APP8). Each application package stored in the database can have an associated location (e.g., Location B is the associated location of the application package APP1, as shown in FIG. 4). As discussed above, for example, the associated location can be a store's physical location (e.g., when the application package is generated for the store) or any location chosen by the store owner (e.g., the store owner may want to associate his customized APP with a certain location where the customers visit frequently).

The method 600 continues at block 602 by receiving a search criterion (e.g., a distance between a user and the association location of the application package) from a user via a user interface (e.g., the input device 304 discussed in FIG. 3). The method 600 can further continue at block 603 by selecting the application packages based on the search criterion (e.g., through the search module 108 or 208). The method 600 then continues at block 604 by displaying at least one selected application package on a map (e.g., received from the map database 12 or 22 by the map module 110 or 210) through the user interface (e.g., the user interface 400 or 500 shown in FIGS. 4 and 5). The selected application packages (e.g., APP1-APP6 shown in FIG. 4) are positioned on the map (e.g., the map 401 in FIG. 4 or the three-dimensional map 501 in FIG. 5) based on corresponding application package locations (e.g., Location B, C, and D shown in FIG. 4). The method 600 can then continue at block 605 by allowing the user to download the selected application package through the user interface. For example, the user can download the selected application package through a download link (e.g., the download link 404, 503, or 505 shown in FIGS. 4 and 5).

In some embodiments, the method 600 can further include generating the application package in response to a request (e.g., made by a store owner as discussed above). The method 600 can further include receiving and displaying an image (e.g., the picture of the store), a title (e.g., the store name), a record (e.g., the download number), or an APP status (e.g., there is another user downloading the application package) associated with the selected application package on the map based on the corresponding application package location. In some embodiments, the method 600 can further include recording a download number related to each selected application package (e.g., by the record module 106 or 206), and calculating a fee to be charged or points to be allocated based on the download number (e.g., by the calculation module 107 or 207). In other embodiments, the method 600 can further include assigning a ranking number (e.g., assigned by the ranking module 104 or 204) to each application package based on a specific factor (as discussed above), and assigning a special ranking number (having priority over regular ranking numbers) to at least one of the application package.

Figure 7:
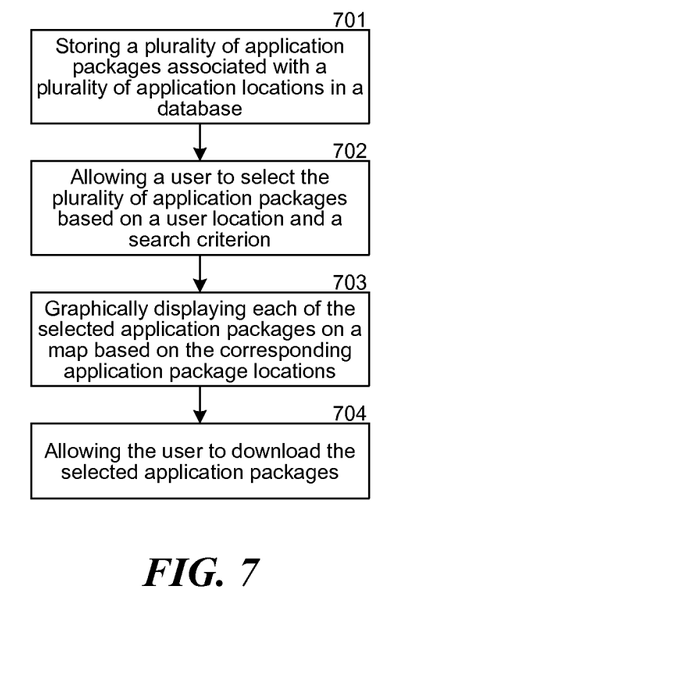
FIG. 7 is a flowchart illustrating a method for providing a location-based APP service in accordance with embodiments of the present technology.

FIG. 7 is a flowchart illustrating a method 700 for providing a location-based APP service in accordance with embodiments of the present technology. As shown in FIG. 7, the method 700 can start at block 701 by storing a plurality of application packages associated with a plurality of application locations in a database (e.g., the storage device 11). The method 700 can continue at block 702 by allowing a user to select the plurality of application packages based on a user location (e.g., received from the user or retrieved from a GPS device) and a search criterion (e.g., received from the user via the input device 306). The method 700 can further continue at block 703 by graphically displaying each of the selected application packages on a map based on the corresponding application package locations (e.g., FIG. 4 or 5). The method 700 can then continue at block 704 by allowing the user to download the selected application packages (e.g., through the download link 404, 503, or 505).

From the foregoing, it will be appreciated that specific embodiments have been described herein for purposes of illustration, but that various modifications may be made without deviating from the spirit and scope of the present technology. Moreover, aspects described in the context of particular embodiments may be combined or eliminated in other embodiments. Further, although advantages associated with certain embodiments have been described in the context of those embodiments, other embodiments may also exhibit such advantages, and not all embodiments need necessarily exhibit such advantages to fall within the scope of the present technology.

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or sub-combinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

While the above description describes certain examples of the invention, and describes the best mode contemplated, no matter how detailed the above appears in text, the present technology can be practiced in many ways. Details of the system may vary considerably in its specific implementation, while still being encompassed by the present technology disclosed herein. As noted above, particular terminology used when describing certain features or aspects of the present technology should not be taken to imply that the terminology is being redefined herein to be restricted to any specific characteristics, features, or aspects of the present technology with which that terminology is associated. In general, the terms used in the following claims should not be construed to limit the present technology to the specific examples disclosed in the specification, unless the above Detailed Description section explicitly defines such terms. Accordingly, the actual scope of the present technology encompasses not only the disclosed examples, but also all equivalent ways of practicing or implementing the invention under the claims.

I claim:

1. A system for downloading location-based applications, the system comprising:
   a hardware memory storing computer-executable means of:
      communicating with a hardware storage device storing a plurality of application packages, wherein each application package is assigned with an application package location that comprises geographic coordinates;
      receiving a search criterion from a user via a user interface;
      selecting at least one of the plurality of application packages that positively matches at least one attribute of the search criterion;
      displaying the at least one selected application package on a geographical map through the user interface, wherein the at least one selected application package is positioned on the geographical map based on the geographic coordinates of its assigned application package location; and
      allowing the user to download the at least one selected application package through the geographical map of the user interface; and
   a hardware processor for executing the computer-executable means stored in the hardware memory.

2. The system of claim 1 wherein the computer-executable means further include:
   recording a download number related to each of the at least one selected application package; and
   calculating at least one of a fee to be charged or points to be allocated based on the download number.

3. The system of claim 1 wherein the computer-executable means further include:
   receiving an image, a title, a record, or a status associated with the at least one selected application package; and
   displaying the image, the title, the record, or the status associated with the at least one selected application package on the geographical map based on the geographic coordinates of its assigned application package location.

4. The system of claim 1 wherein the computer-executable means further include assigning a ranking number to each of the at least one selected application package based on a specific factor.

5. The system of claim 4 wherein the specific factor includes: a distance between a user location and the at least one application package location corresponding to the at least one selected application location; the time that the at least one selected application package is generated; the time that the at least one selected application package is stored; the number that the at least one application package has been downloaded; the number that a hyperlink associated with the at least one selected application package has been accessed; a fee associated with the at least one selected application package; or points associated with the at least one selected application package.

6. The system of claim 4 wherein the computer-executable means further include assigning a special ranking number to at least one of the at least one selected application package, wherein the special ranking number has priority over the ranking number.

7. The system of claim 4 wherein the computer-executable means further include storing the ranking number of each of the at least one selected application package and the specific factor in an attribute database.

8. The system of claim 4 wherein the computer-executable means further include displaying the at least one selected application package on the geographical map based on the corresponding ranking number.

9. The system of claim 1 wherein the computer-executable means further include generating the plurality of application packages in response to a request, wherein the request includes a title, an image, or a set of coordinate associated with the plurality of application packages.

10. The system of claim 1 wherein the user interface further includes an image code associated with one of the at least one selected application package.

11. The system of claim 1 wherein the at least one selected application package downloaded by the user is further installed by the user.

12. The system of claim 1 wherein each of the plurality of application packages selected has an instant messaging function.

13. A system for providing a location-based application service implemented by a hardware processor, the system comprising:
   a hardware storage device configured to store a plurality of application packages wherein each of the plurality of application packages is assigned with an application package location comprises of geographic coordinates;
   an application search module configured to allow a user to select at least one of the plurality of application packages based on at least one attribute of a search criterion that positively matches the at least one selected application package;
   a display module configured to graphically display each of the at least one selected application package on a geographical map based on the geographic coordinates of its assigned application package location; and
   a download module configured to allow the user to download the at least one selected application package via the geographical map of the display module.

14. The system of claim 13, further comprising:
   a record module configured to record a download number of each of the at least one selected application package; and
   a calculation module configured to calculate at least one of a fee or points corresponding to the download number.

15. The system of claim 13, further comprising a location module configured to receive an image, a title, a record, or a status associated with the at least one selected application package, wherein the display module is further configured to display the image, the title, the record, or the status on the geographical map when the at least one of the plurality of application packages is selected to generate the at least one selected application package.

16. The system of claim 13, further comprising a ranking module configured to assign a ranking number to each of the at least one selected application package based on a specific factor.

17. The system of claim 16 wherein the specific factor includes: a distance between the user location and the at least one application location corresponding to the at least one selected application package; the time that the at least one selected application package is generated; the time that the at least one selected application package is stored; the number that the at least one selected application package has been downloaded; the number that a hyperlink associated with the at least one selected application package has been accessed; a fee associated with the at least one selected application package; or points associated with the at least one selected application package.

18. The system of claim 16 wherein the ranking module further assigns a special ranking number to at least one of the at least one selected application package, wherein the special ranking number has priority over the ranking number.

19. The system of claim 16 wherein the ranking number of each of the at least one selected application package and the specific factor are stored in an attribute database.

20. The system of claim 16 wherein the at least one selected application package is displayed on the geographical map based on at least one ranking number respectively corresponding to the at least one selected application package.

21. The system of claim 13, further comprising a generation module to generate the plurality of application packages in response to at least one request, wherein the at least one request includes a title, an image, or a set of coordinate associated with the plurality of application packages.

22. The system of claim 13 wherein the user interface further includes an image code associated with the at least one selected application package.

23. The system of claim 13 wherein the at least one selected application package downloaded by the user is further installed by the user.

24. The system of claim 13 wherein each of the plurality of application packages selectively has an instant messaging function.

25. An apparatus for implementing a location-based application service, comprising:
 a hardware memory storing computer-executable means of:
  receiving a user location and a search criterion from a user;
  assigning at least one application package location comprises of geographic coordinates to each of a plurality of application packages on a server;
  selecting at least one application packages based on the user location and at least one attribute of the search criterion that positively matches the selected application packages;
  displaying at least one selected application package on a geographical map based on the geographic coordinates of its assigned application package location; and
  allowing the user to download the at least one selected application package through a download interface; and
 a hardware processor for executing the computer-executable means stored in the hardware memory.

26. The apparatus of claim 25 wherein the computer-executable means further include:
 communicating with the server via a wireless network; and
 displaying the plurality of selected application packages on the geographical map based on a ranking number associated with each of the plurality of selected application packages, wherein the ranking number is determined based on a specific factor.

27. The apparatus of claim 26 wherein the specific factor includes: a distance between the user location and the at least one application location corresponding to the plurality of selected application packages; the time that the plurality of selected application packages are generated; the time that the plurality of selected application packages are stored; the number that the plurality of selected application packages have been downloaded; the number that a hyperlink associated with the plurality of selected application packages have been accessed; a fee associated with the plurality of selected application packages; or points associated with the plurality of selected application packages.

28. The apparatus of claim 26 wherein the computer-executable means further include displaying at least one of the plurality of selected application packages on the geographical map that has a special ranking number having priority over ranking numbers of the other of the plurality of selected application packages.

29. The apparatus of claim 25 wherein the computer-executable means further include displaying an image, a title, a record, or a status associated with the plurality of selected application packages, wherein the image, the title, the record, or the status is indicated on the geographical map based on the geographic coordinates of its assigned application location.

30. The apparatus of claim 25 wherein the computer-executable means further include displaying an image code in the download interface, wherein the image code is associated with the plurality of selected application packages.

31. The apparatus of claim 25 wherein the plurality of selected application packages downloaded by the user are further installed by the user.

32. The apparatus of claim 25 wherein each of the plurality of selected application packages selectively has an instant messaging function.

* * * * *